United States Patent [19]

Schenk

[11] 4,063,335
[45] Dec. 20, 1977

[54] CLIP RECEPTACLE
[75] Inventor: Peter Schenk, West Islip, N.Y.
[73] Assignee: Dzus Fastener Co., Inc., West Islip, N.Y.
[21] Appl. No.: 657,103
[22] Filed: Feb. 11, 1976
[51] Int. Cl.² .............................................. A44B 17/00
[52] U.S. Cl. .................................... 24/221 R; 85/5 P
[58] Field of Search ............ 24/221 K, 221 A, 221 R, 24/221; 85/5 P; 292/59

[56] References Cited
U.S. PATENT DOCUMENTS 226,487   4/1880   Byam ...................................... 292/59

Primary Examiner—Bernard A. Gelak
Attorney, Agent, or Firm—Kane, Dalsimer, Kane, Sullivan & Kurucz

[57] ABSTRACT

A receptacle for attachment to one of two members to be fastened together and for interengagement with a stud coupled with the other of the two members. The receptacle includes a thin elongated body having a configuration facilitating its mounting and use in close relationship to an adjacent wall surface. The body has a receiving flange thereon including an aperture for passage of a portion of a stud therethrough for coupling therewith. A spring is on the body to accommodate reciprocation of the portion of the stud coupled therewith during fastening and unfastening operations. One of the body and the stud has a spiral cam slot therein. The other of the body and the stud has cam follower surfaces thereon so that when the body is coupled with the stud the slot will be aligned with the follower surface so that relative rotation between the stud and receptacle will permit axial movement of the cam follower surface in the cam slot and accompanying the axial movement of the stud with respect to the receptacle between the locked and unlocked positions. The body is adapted for attachment to one of the members to be fastened so that when a stud is coupled with the other member to be fastened and the stud and receptacle are interengaged the two members can be fastened together.

6 Claims, 8 Drawing Figures

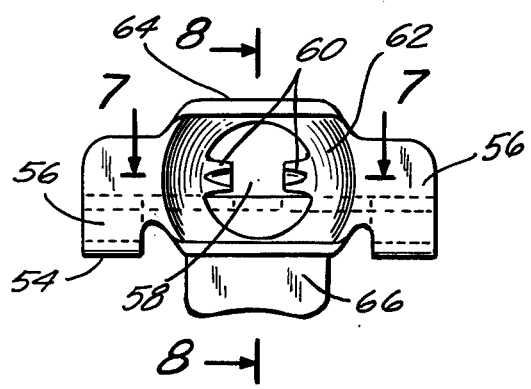
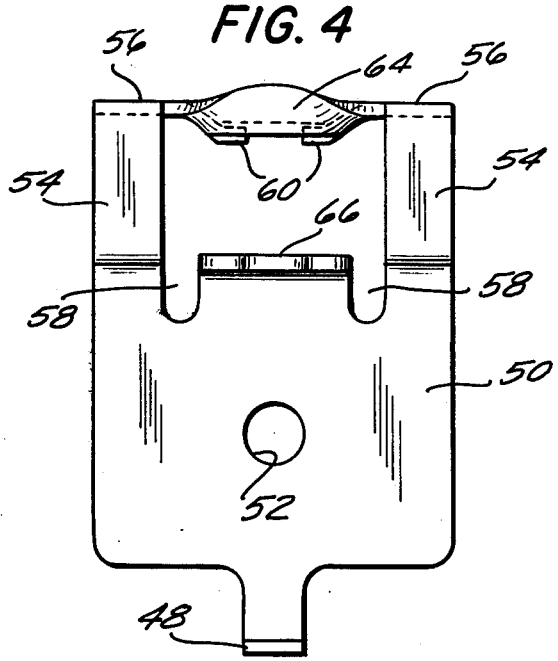
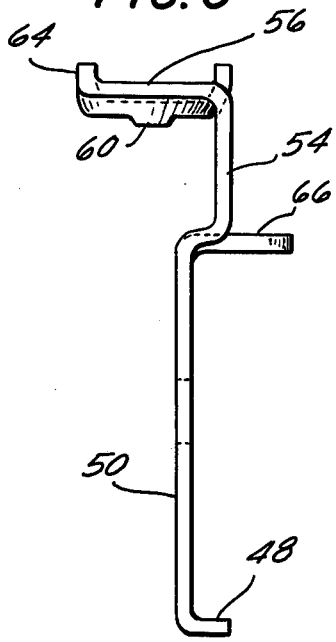
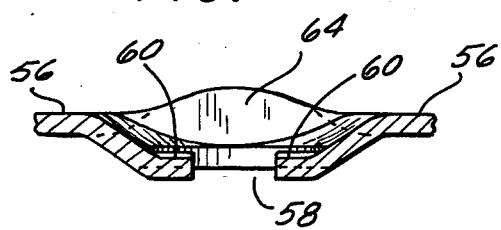
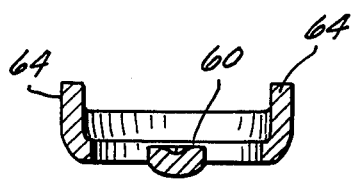

CLIP RECEPTACLE

BACKGROUND OF THE INVENTION

In certain confined areas where space is at a premium and closures are required, it is desirable to have the minimum amount of space occupied by the latch or fastener mechanism for the closure. This type of problem is prevalent in locations such as where control boxes for motors and the like are emploed and it is desired to utilize maximum space within the control box or rack for the necessary control equipment. Accordingly, it is of a value to have the fastener mechanism located as close to a peripheral wall as possible and to provide a control mechanism which does not project into the operation space within the enclosure beyond a minimum amount. Not only is this feature desirable from a space saving aspect but also for clearance purposes when one has to gain access to the contents within the enclosure which is often the case when a control box is the structure under consideration. By providing a fastener or latch mechanism in a position where it does not interfere with access to the interior of the box, a more desireable work environment and ease of use is achieved.

SUMMARY OF THE INVENTION

With the above background in mind, it is among the primary objectives of the present invention to provide a low cost quarter-turn fastener assembly which can function in limited space with simple installation. The key element in the assembly is the receptacle which can be of a one piece design and is structured to accomplish the following objectives. The receptacle is designed with structure thereon for facilitating its positioning for ease of assembly and use. Incorporated within the receptacle are means to facilitate its attachment to a wall in fixed position and means are provided to achieve the necessary spring action for facilitating the coupling of the receptacle with a stud fastener element. Furthermore, the receptacle is structured so that it has surfaces which facilitate interengagement between the stud portion of the fastener and the receptacle. Receiving surfaces are provided on the receptacle to assist in engagement with a stud member so that a quarter-turn is all that is necessary between the fastened and unfastened conditions. Furthermore, it is an objective of the present invention to provide a stop mechanism for supporting the enclosure or panel which is coupled to the receiving surfaces by means of the fastener assembly including the present receptacle invention. The overall structure of the receptacle is such that it is of minimum width so as to provide the desired and required clearance both laterally and vertically and to occupy the minimum space thereby facilitating a greater area for use within a given type of enclosure and providing an easier access to the contents of the enclosure.

In summary, the receptacle is designed for attachment to one of two members to be fastened together and for interengagement with a stud coupled with the other of the two members. The receptacle includes a thin elongated body member to be coupled in close alignment with an adjacent wall. The body includes a receiving flange for receipt of the stud through an opening therein in coupling and uncoupling relationship when the stud is coupled with one member and the receptacle is coupled with the other member. Spring means is on the body to provide the necessary axial movement of the flange portion of the body during the fastening and unfastening interconnection with the stud. One of the stud and flange has surfaces forming a spiral cam slot thereon and the other of the flange and stud has a cam follower surface whereby interconnection between the stud and body produces alignment between the cam follower surface and the slot whereby rotational movement therebetween will cause the spring means to permit the cam follower surface to move along the helical slot and fasten the two members together. Finally, attachment means are provided on the body to facilitate its attachment to the one member.

With the above objectives among other in mind, references had to the attached drawings.

BRIEF DESCRIPTION OF THE DRAWINGS

FIG. 4 is a side elevation view of the receptacle of the invention;

FIG. 5 is a top plan view thereof;

FIG. 6 is an end elevation view thereof;

FIG. 7 is a fragmentary sectional view thereof taken along the plane of line 7—7 of FIG. 5;

FIG. 8 is a sectional view thereof taken along the plane of line 8—8 of FIG. 5.

DESCRIPTION OF THE PREFERRED EMBODIMENTS

Figure 1:
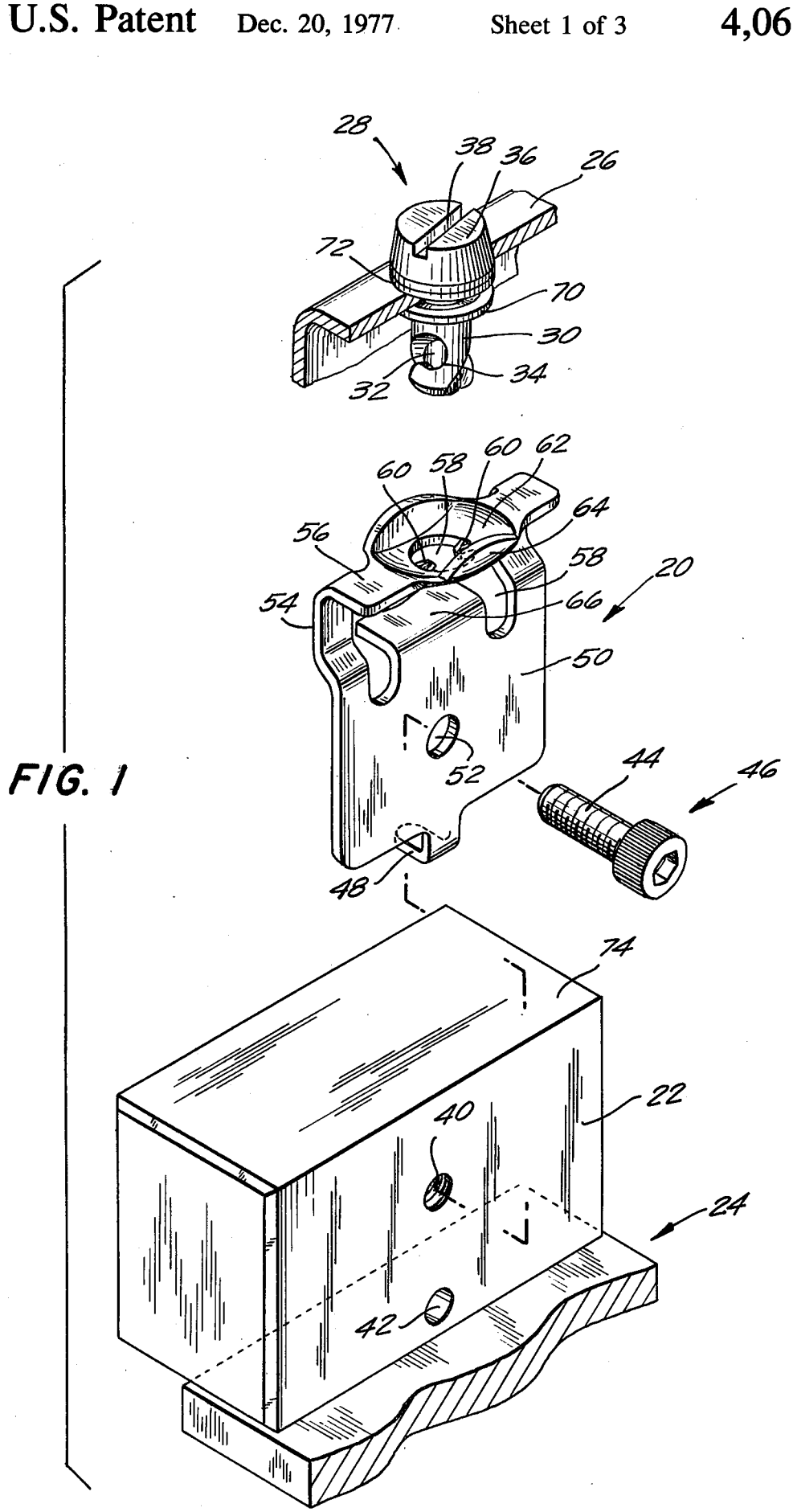
FIG. 1 is an exploded fragmentary view of an assembly incorporating the receptacle of the invention.
Figure 2:
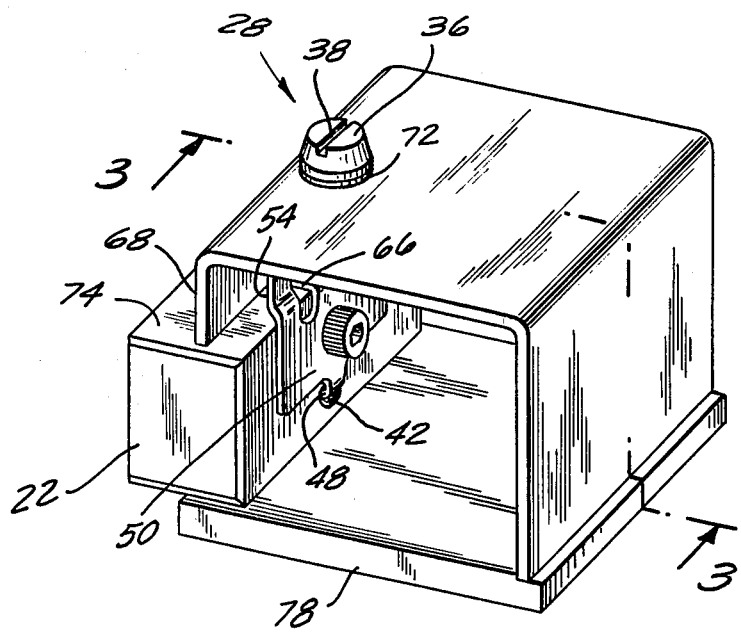
FIG. 2 is a perspective view thereof showing the components in fastened and assembled condition.
Figure 3:
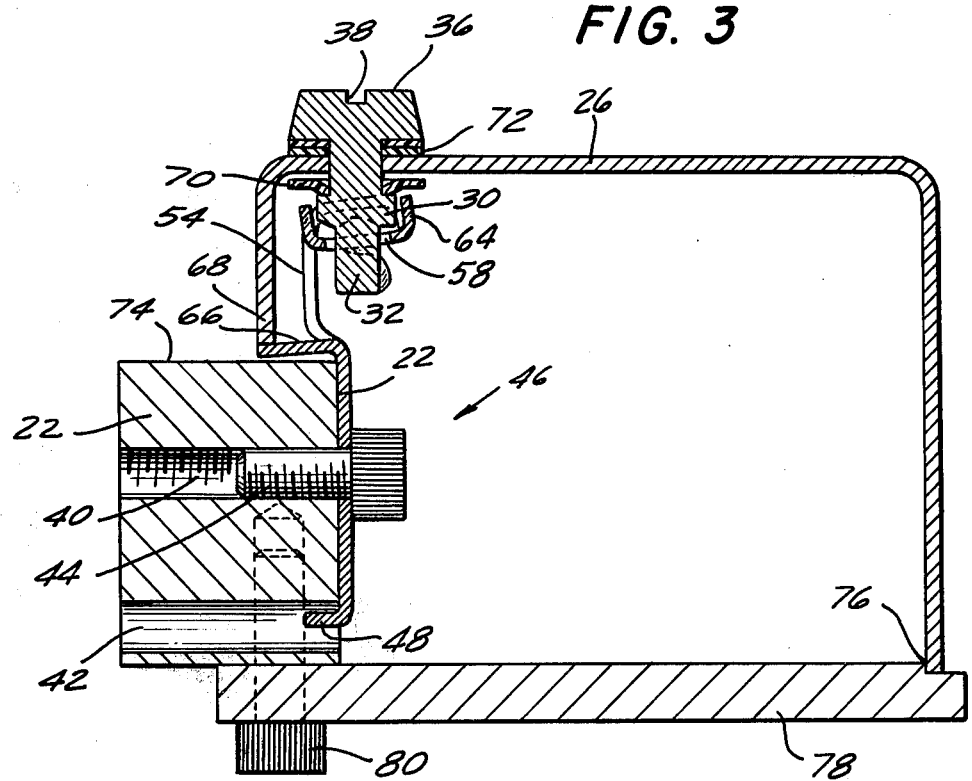
FIG. 3 is a sectional view thereof taken along the plane of line 3—3 of FIG. 2.

Receptacle 20 is depicted in FIG. 1 along with the accompanying components with which it is utilized. It is designed for fastening to a wall 22 of a box or member 24. Wall 22 is an interior wall of the box 24 and the box is designed to receive a cover 26 to form an enclosure. In this particular environment the receptacle 20 is of use in providing maximum access to the interior of box 24 when cover 26 is removed and also provides the greatest interior space for the box 24 for containment purposes. This is particularly useful in environments where control boxes are employed and a relatively small enclosure is utilized to house a large amount of equipment. In that environment, ease of access to the equipment is of great value as well as utilization of the maximum amount of space within the enclosure. Receptacle 20 is designed to project as little as possible from the plane of inner wall 22 of the box. Naturally the receptacle 20 is adaptable for use in other types of fastening arrangements for the coupling of two members in addition to the environment depicted and described as an example in the present application.

Receptacle 20 is designed to receive a stud 28 in a conventional type of quarter-turn fastening and unfastening relationship. The components are designed so that the cam follower and the cam slot which provide the locking an unlocking movement can be provided on either the stud or the receptacle. In the embodiment shown, the reduced shank 30 of the stud contains the spiral cam slot 32 which is initiated at the bottom end of shank 30 and terminates in a locking detent 34.

The enlarged head 36 of the stud is provided with a slot 38 for engagement by a tool to achieve the desired rotational movement for locking and unlocking operations.

Cover 26 is provided with an opening large enough to receive shank 30 therethrough and smaller than the outer diameter of head 36. Accordingly, when shank 30 is passed through the opening in cover 26 the undersurface of head 36 will abut the upper surface of cover 26.

The inner surface of wall 22 is provided with two aligned apertures, an upper aperture 40 and a lower aperture 42. The upper aperture has a threaded surface for receipt of the threaded shank 44 of a fastener bolt 46. The lower aperture 42 is designed for receipt of an aligned tab 48 extending laterally from the bottom end of receptacle 20.

The main body portion 50 of receptacle 20 is a thin flat member designed to abut against the inner surface of wall 22 with minimum lateral projection. As stated above, tab 48 is designed to fit in lower aperture 42 and a central opening 52 is provided in body 50 for alignment with threaded aperture 40 in wall 22. When apertures 40 and 42 are aligned with tab 48 and opening 52 threaded shank 44 of fastener bolt 46 can be threadedly interengaged with wall 22 thereby mounting receptacle 20 in position against the wall.

The upper end of flat body 50 is integrally formed with a U-shaped bend 54 which terminates in a lateral flange 56. The central portion of the U-shaped bend is formed with a cut-out portion 58 to form a weakened area at the location of U-shaped bend 54 to provide a spring like action at the location of flange 56. Intermediate the ends of flange 56 is an opening 58 which contains a pair of inwardly extending opposing tabs or tines 60 which form the cam followers for engagement with helical slot 32 in stud 28. A fustroconical surface 62 is provided in the upper surface of flange 56 surrounding a major portion of opening 58 to facilitate introduction of stud shank 30 therein for engagement with tabs 60. A pair of opposing upstanding wall portions 64 are integrally formed with the fustroconical portion 62 to provide additional guidance and support for the stud as it is introduced through the opening to facilitate operation of the fastener assembly when the cover 26 is applied to the box 24.

Extending laterally through the cut-away portion 58 just below the location of the U-shaped spring means 54 is a laterally extending plate 66 which forms a stop to positively seat the bottom rim 68 of the cover 26 when the stud and receptacle are fastened. As shown, stop 66 is integrally formed with remainder of receptacle 20 by bending the portion formed interiorly of the cut-away or removed portion 58. The receptacle 20 can be formed inexpensively of a one piece desing of metal or plastic, for example in the form of a metal stamping. With the receptacle 20 being formed in a one piece design, all that is required for completing the fastener assembly is a stud 28 and a fastener bolt 46. The appropriate opening 40 and 42 can be provided in the receiving wall for facilitating alignment as well as an appropriate opening in cover 26. To facilitate tight fastening relationship between the components, a conventional type of washer 70 can be provided for positioning on shank 30 against the undersurface of cover 26 where the shank passes through the opening therein. Similarly, if desired, a washer 72 can be provided on the underside of head 36 for a corresponding purpose. These washers can be of a conventional material such as nylon or rubber.

In use, receptacle 20 is easily mounted on wall 22 by positioning tab 48 in aperture 42 and aligning opening 52 with aperture 40. A fastener bolt 46 is than inserted through the aligned openings 52 and 40 and threadedly interengaged therewith to hold the receptacle 20 in position. The receptacle is than in proper alignment for receipt of the stud 36 which has been passed through the opening in cover 26 with the appropriate washers, if desired, in position as shown. The stop 66 is positioned laterally over the upper surface 74 of wall 22 in position for engagement with rim 68 on cover 26. In the depicted embodiment, the cover is U-shaped in configuration with a longer leg designed for seating in recess 76 of base 78 of the enclosure or box. The base 78 is coupled with the side wall 22 by means of an appropriate bolt threadedly engaged with a threaded receiving hole in the underside of wall 22. The cover is then advanced until shank 30 passes through opening 58 and tabs 60 come into alignment with helical slot 32. An appropriate tool is positioned in slot 38 in stud 28 and the stud is rotated thereby causing the tabs to follow cam slot 32 into the locking detent 34. This can be accomplished in the conventional manner by quarter-turn rotation of the stud. The amount of rotation required for the locking action is a matter of choice with a quarter-turn rotation having been found to operate effectively. To accommodate the axial or vertical movement of the tabs 60 as they advance in slot 32, flange 56 is permitted to be resiliently shifted axially due to the built-in spring means within receptacle 20 as formed by the U-shaped portion 54 and the removed cut-away portion 58. This locking action will be accompanied by interengagement between the bottom rim 68 and laterally extending stop 66 to provide for tight positioning and fastening of the cover.

When access is desired to the interior of the box all that is required is that the stud slot 38 be engaged by an appropriate tool and rotated a quarter-turn distance in the opposite direction thereby freeing tabs 60 from slot 32 with the required axial movement for this operation once again being accommodated by the spring means built into receptacle 20. With stud 28 thus disengaged from receptacle 20, the cover 26 can then be removed. With minimum projection of the receptacle within the interior of the box 24, maximum access is permitted to the contents of the box. Furthermore, the receptacle is designed so that there is a minumum amount of projection into the interior of the box when it is mounted in position thereby providing for a greater space within the box for actual use. The receptacle is inexpensively manufactured and can be easily and efficiently installed for use.

It would be kept in mind that other uses for the receptacle are readily apparent in addition to a control box. For example, the receptacle is designed for use in an arrangement where two doors side-by-side are employed and, once again, maximum clearance is desired for access along with utilization of a minimum amount of space for the receptacle. The overall purpose of the device is to provide a low cost quarter-turn fastener assembly to function in limited space with simple installation. The one piece receptacle is of significance in that it can be formed in one piece as a metal stamping or the like and includes thereon the following features. It has a bent out tab for positioning or alignment purposes and requires only a single hole for a single screw or bolt mounting. It includes a spring tension capability provided by the bent weakened configuration at one end. It is provided with a conical lead for ease of stud insertion. It is provided with a pair of inwardly projecting integral tines located in a hole for engagement with a slotted stud. It includes an integral stop provided for panel support and the overal structural configuration of the receptacle is of minimum width to provide required and desired clearance.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A receptacle for attachment to one of two members to be fastened together and for interengagement with a stud coupled with the other of the two members comprising:

A thin elongated body having a configuration facilitating its mounting and use is close relationship to an adjacent wall surface, the body having a receiving flange extending in a first direction traverse to said body and including an aperture for passage of a portion of a stud therethrough for coupling therewith, spring means on the body to accommodate the reciprocation of the portion of the stud coupled therewith during fastening and unfastening operations, one of the body and the stud to be fastened therewith having a spiral cam slot therein and the other of the body and the stud having cam follower surfaces thereon so that when the body is coupled with the stud the slot will be aligned with the follower surface so that relative rotation between the stud and receptacle will permit axial movement of the cam follower surface in the cam slot and accompanying axial movement of the stud with respect to the receptacle between the locked and unlocked positions, and attachment means on the body for attaching the body to one of the members to be fastened so that when a stud is coupled with the other member to be fastened and the stud and receptacle are interengaged the two members can be fastened together, alignment means on the body to facilitate alignment of the receptacle with respect to the one member to which it is attached and for receipt of the stud and other members coupled therewith, and the spring means being in the form of a U-shaped portion with said flange being one leg of the u-shaped portion and the other leg being integrally connected to said body, said U-shaped portion being weakened by a central slot through the bight of said U-shaped portion so as to provide resilience to that portion of the body and permit axial movement of portions of the body in response to an axial force supplied thereto, a lateral stop extending from the body into and through said slot in a direction opposite to said first direction for engagement and support of the other member, the stop having a free end and being spaced from the adjacent surface of the one member, said lateral stop being substantially parallel to said flange.

2. The invention in accordance with claim 1 wherein the alignment means includes a laterally extending tab for insertion in an accommodating recess in the wall of the one member.

3. The invention in accordance with claim 1 wherein the attachment means on the body includes an aperture intermediate the ends for alignment with a corresponding aperture in the wall of the one member to which the receptacle is to be fastened so that a fastener element can be placed through the aligned holes to attach the receptacle to the one member.

4. The invention in accordance with claim 1 wherein the flange includes a central aperture for receipt of portion of the stud therethrough and interengagement of the cam follower surfaces with the cam slot so that rotation of the stud and travel of the cam follower along the spiral cam slot will be permitted by the resilience of the flange to permit the required axial movement.

5. The invention in accordance with claim 4 wherein the surfaces surrounding the opening in the flange have a frustroconical configuration to facilitate introduction of the stud through the opening and into interengagement with the receptacle.

6. The invention in accordance with claim 1 wherein the spiral cam slot is in the stud to be coupled with the receptacle and the cam follower surfaces include a pair of opposing tabs extending inwardly into an opening formed on a receiving flange on the body for coupling and uncoupling with respect to the stud.

* * * * *